Nov. 26, 1963   D. G. DAVIS   3,112,447
ANTENNA FLOAT WITH ACTUATING SYSTEM
Filed March 9, 1961   2 Sheets-Sheet 1

INVENTOR.
DONALD G. DAVIS
BY
*Edwin Coates*
ATTORNEY

Nov. 26, 1963     D. G. DAVIS     3,112,447
ANTENNA FLOAT WITH ACTUATING SYSTEM
Filed March 9, 1961     2 Sheets-Sheet 2
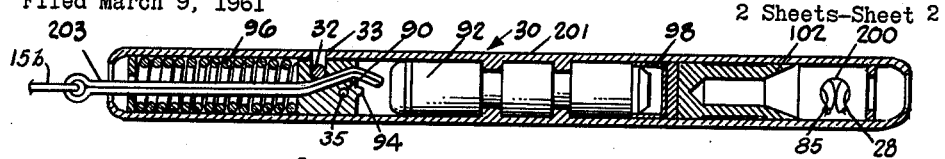
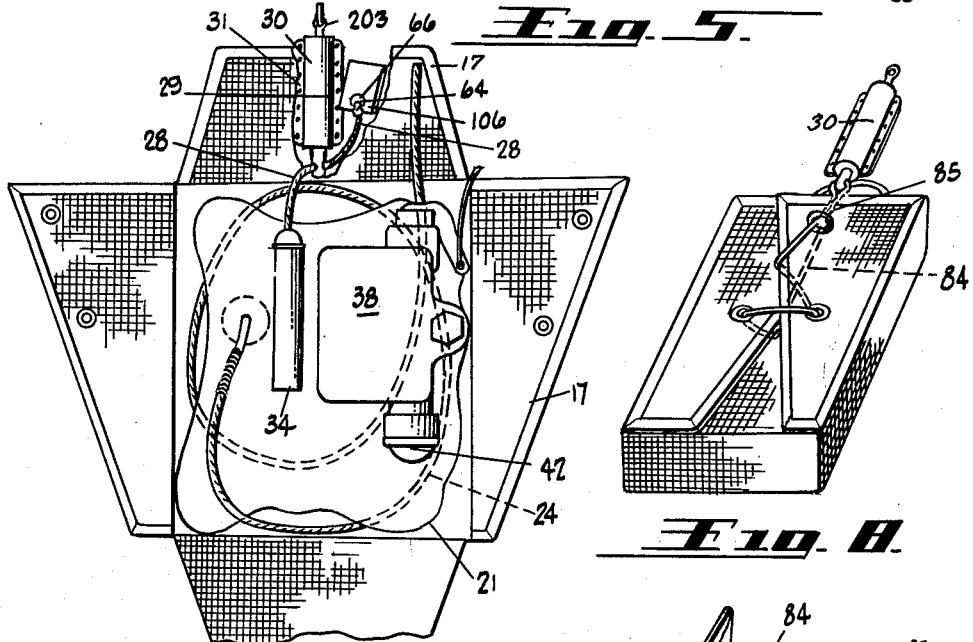
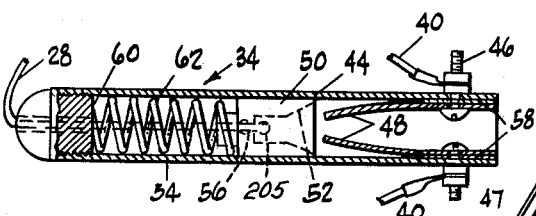
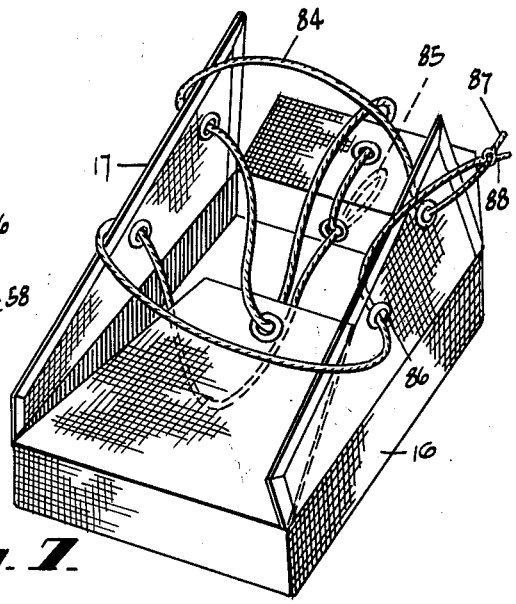
INVENTOR.
DONALD G. DAVIS
BY
ATTORNEY.

United States Patent Office 3,112,447
Patented Nov. 26, 1963

3,112,447
ANTENNA FLOAT WITH ACTUATING SYSTEM
Donald G. Davis, Northridge, Calif., assignor to Douglas
Aircraft Company, Inc., Santa Monica, Calif.
Filed Mar. 9, 1961, Ser. No. 94,569
5 Claims. (Cl. 325—118)

This invention relates to signalling means normally carried on the person of an aircraft occupant but which may be mounted to an aircraft, missile nose cone, a travelling vehicle or a "package" or pod to be recovered, such means being effective to emit radio frequency signals that help locate the person, vehicle or "package" when it comes to rest either on a body of water or on the land, to enable search or rescue parties to quickly and accurately locate the object when it has come to rest.

In subsistent devices of this general class, it is necessary, upon its "landing," or coming to rest, for the bailed-out occupant or vehicle or "package" to proceed or to be manipulated as follows: (1) manually assemble and erect an antenna and then (2) manually actuate a transmitter, that is, tap out emergency radio signals on the transmitter.

The present invention provides an improved device of this general class that includes means carried by the object being searched for, which means has, in its assemblage a landing parachute, a portion of said means attached to a parachute riser for deploying a float carrying an antenna connected to a transmitter, in turn connected to a battery, all being carried in a simple support means, such as a vest worn by the crewman in addition to the usual parachute. Upon performing a simple triggering action, namely, deploying the parachute, the device automatically both erects and supports or floats an assembled, but theretofore collapsed, antenna and automatically initiates the radiation of emergency signals from the now upright antenna.

In order to achieve these and other ends, the present invention, in one embodiment, comprises a fabric or textile vest, or the like, the vest including three pockets. In a first one of these pockets there is securely mounted an adequate, though compact, electric battery or mercury cell which, upon the parachute's triggering the unit, energizes a small but adequate radio transmitter carried in a second pocket in the vest. The third vest pocket contains a normally compactly collapsed antenna mounted in this collapsed condition at least partially inside a normally collapsed automatic antenna "float" and antenna erector. This float, when inflated, has a buoyancy adequate to maintain it upright in water. It also possesses a sufficient amount of rigidity, or self-sustentation, in reference to center of gravity location, to assume an erect, or substantially erect, attitude and to hold the extended antenna substantially erect when the device is resting upon land, thereby to increase radio frequency radiation efficiency and range.

The float, in a currently-preferred form, consists of a bag made of pneumatic life-preserver material. The bag can be of a frusto conical shape when inflated and to visually aid in locating it, it is of a flame-red color. It is automatically inflated by a conventional compressed $CO_2$ cartrdige automatically actuated by a standard automatic inflator. A 243 megacycle coaxial antenna is housed in the float, both normally being in collapsed condition. The coaxial antenna has portions extending through tubing-openings in the top and bottom of the float. In order to prevent damage to the float upon water landing, a sufficiently long lead cable extends from the vest and battery to the float's bottom and connects to the antenna.

In preparing the device for use, the deflated float is packed in the third pocket and secured therein with four closure-flaps held closed with a suitable nylon cord laced through all flaps. There is an inflator switch for triggering the inflator, but this switch is normally held "open" by a tie-off cord anchored at one end to the vest. The flap-lacing cords and the switch tie-off cord both pass through a conventional reefing-cutter including a built-in time delay mechanism. The cutter is attached to the top of the third pocket in such a position as to be actuated by one fork of a bifurcated cord passing therefrom to a parachute riser so that the deployment of the parachute effects severing of both cords passing through the cutter. As a consequence, at the end of a four-seconds time delay, the float inflating mechanism operates to urge the expanding float out of the third pocket, the flap-lacing cord of which has now also been severed by the reefing cutter. The transmitter is also activated by the parachute's deployment. The antenna is extended by the full inflation of the float and hangs from the vest by its four-feet long lead-cord. Because of its truncated conical shape and the weight of the inflator unit on its bottom, the "float" will, upon coming to rest, either on water or on level ground, remain substantially upright, thus maintaining the radiating portion of the erected antenna in substantially the optimum, or near-vertical, position. Preferably, the inflator switch includes a safety pin, as does the reefing cutter, which prevent inadvertent actuation of the mechanism during assembly and maintenance operations. They are removed normally just before bailing out. The switch tie-off cord portion that passes through the reefing cutter is tied to a grommeted tab on the vest and the one end of the switch is abutted against, or placed in juxtaposition to a cord-access grommet on the top edge of the float pocket. The flaps-lacing cord's ends are tied together.

This embodiment of the inventive concepts is illustrated in the accompanying drawings and described hereinafter, in detail, but only in order to render the invention more concrete and not by way of limitation. The invention itself is as, and of the scope, defined in the sub-joined claims.

In these drawings,

FIG. 5 is a longitudinal sectional view of the delayed-action reefing cutter for cutting the switch restraining cord and for contemporaneously cutting the lacing holding the pocket-flaps closed;

FIG. 6 is a view of the float pocket with its flaps open, showing the arrangement of the normally collapsed float, the normally collapsed antenna and the electric lead therefrom to the radio frequency transmitter;

FIG. 7 is a perspective view of the float pocket, minus its contents and with the flaps partially open, illustrating the arrangement of the flap lacing, and showing the bight in the center of lacing cord which passes through the reefing cutter;

FIG. 8 illustrates the closed float-pack in combination with the reefing cutter; and FIG. 9 is a longitudinal sectional view of the inflator-actuating switch.

Figure 1:
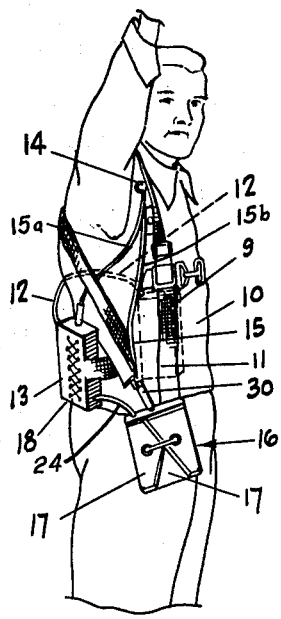
FIG. 1 is perspective, or pictorial, three-quarters front view of a crewman wearing a vest of the present invention with actuator connections between certain components of the vest and a point on a parachute harness riser.

There is depicted in the drawings a construction for automatically activating an antenna float, erecting a transmitting antenna, initiating the emission of signals from a radio frequency beacon-transmitter, and maintaining the "float" upright on land or water, without any manipulation thereof being required on the part of the bailed out crewman.

These means are shown in the present embodiment as carried by, encompassed in, or attached to, a light but durable textile vest 10 which, since it is not noticeably heavy, may be worn at all times during flight by the crewman.

In the rear portion of the vest there are two pockets, a first pocket 9 encasing a mercury battery 11 and the second pocket 13 housing a radio frequency signal transmitter 18. The radio circuit is a "one-way only" circuit or beacon system, since it does not include a radio receiver. The battery 11 is connected to the transmitter by a conductor 12 routed through the vest behind the back of the crewman and the ratio transmitter is connected to the float in pocket 16 by lead 24.

Two of the vital elements of the invention, the antenna and its float or erector, are carried in this pocket 16 on the front of the airman. This pocket is rectangular with four flaps 17 laced together by a nylon cord 84. Cord 84 includes a bight 85 which passes through a reefing cutter 30, the construction of which is hereinafter described. The reefing cutter 30 is conditioned by withdrawal of safety pin 35 and actuated by the pull on 203 of one of the furcations or portions 15b of a bifurcated cord 15 when the parachute deploys and extends the parachute riser to which bifurcated cord 15 is attached by a snap-hook 14. The severed lacing is pushed out of the flaps by the inflating float 21 when 21 expandingly ejects itself from pocket 16.

Cord 15 is bifurcated and one fork 15a extends from the riser to the transmitter to activate the transmitter-antenna unit, while the other fork 15b extends to the reefing cutter, as aforementioned. The transmitter 18 is automatically energized when the cord 15 and the fork 15a are pulled through extension of the parachute riser.

In FIG. 6, the collapsed, packed float 21 is shown in the opened pocket, along with a four foot long electrical lead 24 from the vest to the float. This length of lead is desirable to, among other advantages, prevent excessive loads being exerted on the lead to antenna to float connections during water landing wherein the parachutist sinks a few feet under water and the float remains on the water surface.

Figure 2:
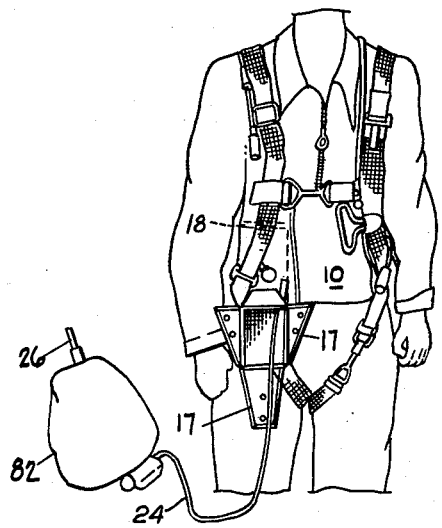
FIG. 2 is perspective front view of the crewman wearing a parachute over the vest shown in FIG. 1, with the float pocket open, with the antenna float out of its pocket, inflated, and with the antenna erected.
Figure 3:
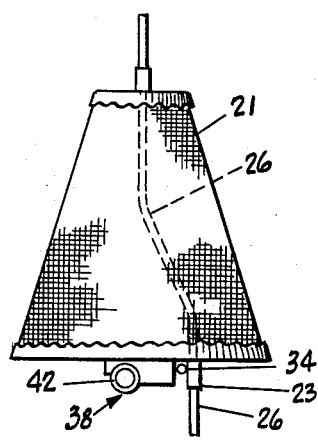
FIG. 3 is a side view of the inflated float and the erected antenna, and also shows the float-inflator unit in end view.

In FIGS. 2 and 3, the float is shown inflated, thereby erecting the antenna which is normally coiled in it and housed in the float pocket. Since the base of the frusto-conical float is wider than the top thereof and since this base bears heavy adjuncts that lower the center of gravity of the inflated float, the latter will tend to remain substantially upright when resting on water or on more or less level ground.

A lead conductor 24 extends from beacon transmitter 18 through the pocket 16 and to the antenna mounted in the float. The extended antenna 26 is shown in FIGS. 2 and 3.

The float is automatically inflated, after the deploying parachute has actuated the reefing cutter 30 as described below, by means including an electric switch 34 normally held in an "open" position by detent means including a tie-off cord 28. As shown in FIGS. 5, 6, 8 and 9 this tie-off cord at one end is anchored restrainingly in the electric switch of FIG. 9, the opposite end passing transversely through an aperture 200 in the reefing cutter 30 shown in FIGS. 5, 6 and 8 and thence through a grommet 64 in a tab 106 on a flap 17, this end of the cord being tied or otherwise anchored to said tab.

As shown in FIG. 5, the cutter 30, which is a conventional device described and published in the catalog, published in 1960, by Ordnance Associates, Inc., 855 El Centro Street, South Pasadena, California, includes a casing 201 encompassing a blade 102 for severing the bight 85 of cord 84 and also cord 28 passing transversely therethrough via aperture 200. The blade 102 is actuated by an explosive cartridge 92, fired by a firing pin 94 normally held back against the action of a spring 96 by means of a pin 203 exerting pressure against a ball 32 and detent 33. The cutter is anchored by a spring type lock ring 29 in a metal bracket 31 which is sewn to the extended back of the pocket 16. When the pin 203 is pulled, the pressure against the ball 32 and detent 33 is released and spring 96 propels the firing pin 94 into activating contact with cartridge 92. This cartridge, after a 4 second delay, in turn fires, and propels the blade 102 through bight 85 and cord 28, severing them and thereby opening flaps 17 and closing switch 34. A safety pin 35 passing through hole 90 and locking the firing pin 94, is provided to prevent inadvertent firing during assembly of the float and pocket. This pin is removed after assembly and prior to issue of the entire system for use or at least before actual use of the system.

The novel switch 34, being now closed, supplies current from mercury battery 76 to the explosive charge in the squib 68, axially moving the firing pin 74. The explosion of the squib forces pin 74 into the puncturable gas seal wall 72 of the capsule 42 containing compressed carbon dioxide, wherefrom $CO_2$ expands into the float through port 210 and inflates it.

The switch 34, in detail, comprises a casing or shell 44, terminal posts 46, 47 for conducting the current from mercury battery 76, normally open contacts 48, a spring-propelled contact closer 50 in the form of a generally cylindric plunger having a concave flared inner end 52, as shown, and an apertured outer end abutted against a coiled spring 62. The casing is provided with a threaded end plug having an axial bore therethrough. A portion of one end of cord 28 passes through the bore and through spring 62, its inner end having a ball-detent 205 seated in the outer end of 50 so that the tie-off cord 28 normally holds the contact-closer 50 away from the switch-contacts, which are insulated at 58 from the casing. Casing 44 has safety pin holes 56 through the sides to accommodate a safety pin (not shown) which engages the closer 50 while the distal end of 28 is being secured.

The distal end of the tie-off cord 28 passes through a lateral aperture 200 in the reefing cutter 30, 200 being provided to properly place in serverable position both the tie-off cord 28 and the bight 85 of the package lacing 84, both of which pass through the reefing cutter. From the reefing cutter, 28 passes through a grommet 64 secured to the adjacent flap 17 by means of a tab 106. This distal end of 28 is secured to the grommet by means of a tie-off in the form of an "eyelet loop," 66.

Figure 4:
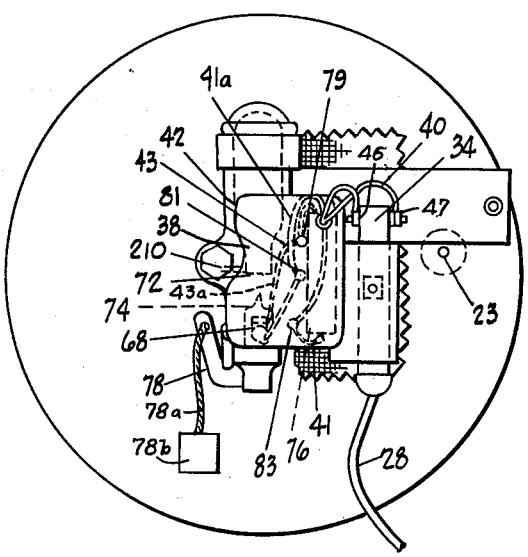
FIG. 4 is a bottom plan view of the float, indicating the switch, switch restraining, or tie-off cord, and other components of the inflator circuitry and, in broken lines, the contents of the inflator, as well as an emergency lever-type manual actuator for the inflator.

The float-inflator group 28, as shown in FIG. 4, is a conventional compressed gas inflator, the terminals plate, squib and battery of which are described and published in the 1960 catalog of Jayel Products Co., Gardena, California. The $CO_2$ cartridge itself is a conventional compressed gas puncturable inflator cartridge described and published in the 1960 catalog of Kidde Manufacturing Co., Belleville, New Jersey, and identified as "Mil-C-00601A". It includes a compressed $CO_2$ capsule 42 having an easily puncturable lower wall 72 coaxially adjacent to a firing pin unit 74 made up of a hollow cylindric pin, pointed at its upper end and slidably encasing a squib 68, composed of an electrically ignitable explosive. The explosive is ignited by a current emanating from a mercury battery 76 connected in a circuit including the terminals 46 and 47 of switch 34 so that when the reefing cutter severs the tie-off cord 28, the switch closes and current passes from the mercury battery 76 through conductor path 41 and binding post 83 (in terminal box 38). This current is conducted through the switch and passes through conductor path 40 to post 79 and via path 43 to the explosive 68. The resultant expansion of gases in 74 forces the firing pin 74 through wall 72 and the pressurized $CO_2$ passes through aperture 210 into the collapsed packed float, thus expanding it and forcing it out of the now open pocket, the flaps 17 of which have been opened by severance of the lacing bight 85. As later explained, the expansion of the float's top and bottom surfaces away from each other, substantially rectilinearizes, or erects, as shown in FIG. 3, the flexible antenna theretofore coiled inside it in the position shown in FIG. 6. Conductors 40 and 43 from the switch and from the squib, respectively, tie to binding post 79 on the terminal plate of the inflator unit. Conductor 43a leads from the squib to post 81 and thence to the battery 76 through conductor 41a which ties to post 81.

To meet the contingency that, for some abnormal reason, the electrical components of the squib firing mechanism may become inoperative, a conventional, handlever type manual firing arrangement 78 is provided and may be employed to puncture the $CO_2$ capsule by manual levering of the firing pin 74 through the puncturable wall of the $CO_2$ capsule with consequent inflation of the float. Cord 78a is connected at one end to the lever 78, and has at the other end a knob 78b which can be manually grasped for pulling the lever 78.

The inflated float is shown in FIGS. 2 and 3 as comprising a conoidal figure of revolution; that is, in vertical central section, it is a frustum of a cone.

In FIG. 7, the lacing arrangement for the float-containing pocket is shown. A nylon line 84 is passed as shown through grommets 86 arranged as shown, with a bight 85 passing through 200 in the cutter. The line 84 is pulled tight to close the flaps and the two ends 87 and 88 united by knotting, the bight 85 of the line still passing through the cutter adjacent to the blade.

The operation of the device will have become apparent from the foregoing description.

Although the now preferred embodiment of the invention has been described in detail, it will be perceived by those skilled in this art that various refinements and ramifications in the specific embodiment disclosed may be resorted to without departing from the scope of the invention as defined in the subjoined claims.

I claim:
1. Beacon-type signalling apparatus comprising:
a first electrical energy source;
a radio frequency transmitter connected to said first source and energizable thereby;
an inflatable float including a flexible erectile antenna mounted therein and extending a distance above an extreme upper surface of said float, both said float and said antenna being normally held in collapsed condition;
an electrical lead connecting said transmitter to said antenna;
an energizable cutter including an ignitable explosive charge therein for driving a cutting element thereof;
a second electrical energy source;
an inflator for said float, said inflator being electrically activatable and mounted to an extreme lower surface of said float to render the same bottom heavy, and including a conductor path connecting said second source to said inflator;
a switch for closing said conductor path to activate said inflator when said switch is closed, said switch being biased normally closed and connecting said second source in series with said inflator in said conductor path;
a detent cord connected at one end to said switch for holding the switch open, said detent cord passing through said cutter and having its distal end anchored; and
means for actuating said transmitter and energizing said cutter to effect energization of said transmitter and severance of said detent cord whereby said switch is closed to activate said inflator and inflate said float with said antenna erected to transmitting position.

2. Beacon-type signalling apparatus comprising:
a first electrical energy source;
a radio frequency transmitter connected to said first source and energizable thereby;
a flapped pocket having a plurality of flaps;
an inflatable float including a flexible erectile antenna mounted therein and having an end portion extending a predetermined distance above an extreme upper surface of said float, both said float and said antenna being normally held in collapsed condition in said pocket with flaps closed;
an electrical lead connecting said transmitter to said antenna;
a continuous pocket cord passing through holes near edges of the flaps of said pocket to close the same;
a reefing cutter located near said pocket and including an ignitable explosive charge therein for driving a cutting element thereof, one bight of said pocket cord passing through said cutter for severance thereby;
a second electrical energy source;
an inflator for said float, said inflator being electrically activatable and mounted to an extreme lower surface of said float to render the same bottom heavy, and including
a pointed, axially movable plunger housing a squib,
a conductor path connecting the squib to said second source for effecting firing of said squib and axial movement of said pointed plunger, and
a compressed-gas capsule having a puncturable portion adjacent said pointed plunger;
a switch for closing said conductor path to activate said inflator when said switch is closed, said switch being spring biased normally closed and connecting said second source in series with said squib in said conductor path;
a detent cord connected at one end to said switch for holding the switch open, said detent cord also passing through said cutter and having its distal end anchored; and
means for actuating said transmitter and energizing said cutter to effect energization of said transmitter and severance of said pocket cord and said detent cord whereby said switch is closed to activate said inflator and enable the inflating float to open said flaps and deploy the expanded float with said antenna erected to transmitting position.

3. Emergency signalling apparatus adapted to be worn by an occupant also wearing a parachute that includes a riser, comprising:
a vest;
a first electrical energy source;
a radio frequency transmitter connected to said first source and energizable thereby, both said first source and said transmitter being carried in said vest;

a flapped pocket on said vest, said pocket having a plurality of normally outwardly opening flaps;

an inflatable float including a flexible erectile antenna mounted thereto, both said float and said antenna being normally held in collapsed condition in said pocket with flaps closed;

an electrical lead connecting said transmitter to said antenna;

a pocket cord passing through holes near edges of the flaps of said pocket to close the same;

an energizable cutter located near said pocket, one bight of said pocket cord passing through said cutter for severance thereby when the parachute is deployed;

a second electrical energy source;

an inflator for said float, said inflator being electrically activatable, and including a normally open conductor path to said second energy source;

a switch for closing said conductor path to activate said inflator when said switch is closed, said switch being biased normally closed;

a detent cord connected at one end to said switch for holding the switch open, said detent cord also passing through said cutter and having its distal end anchored; and means connected to said riser for actuating said transmitter and energizing said cutter on tensioning of said riser, and effecting energization of said transmitter and severance of said pocket cord and said detent cord whereby said switch is closed to activate said inflator and enable the inflating float to open said flaps and deploy the expanded float with said antenna erected to transmitting position.

4. Signalling apparatus adapted to be carried on the body of an airborne object attached to a parachute which includes a riser, comprising:

a first electrical energy source;

a radio frequency transmitter connected to said first source and energizable thereby;

a flapped pocket on the body of said object, said pocket having a plurality of normally outwardly opening flaps;

an inflatable float including a flexible erectile antenna mounted therein and extending a distance above an extreme upper surface of said float, both said float and said antenna being normally held in collapsed condition in said pocket with flaps closed;

an electrical lead connecting said transmitter to said antenna;

a pocket cord passing through holes near edges of the flaps of said pocket to close the same;

an energizable cutter located adjacent said pocket and including an ignitable explosive charge therein for driving a cutting element thereof, one bight of said pocket cord passing through said cutter for severance thereby when the parachute is deployed;

a second electrical energy source;

an inflator for said float, said inflator being electrically activatable and mounted to an extreme lower surface of said float to render the same bottom heavy, and including a normally open conductor path to said second energy source;

a switch for closing said conductor path to activate said inflator when said switch is closed, said switch being spring biased normally closed;

a detent cord connected at one end to said switch for holding the switch open, said detent cord also passing through said cutter and having its distal end anchored; and means connected to said riser for actuating said transmitter and energizing said cutter on tensioning of said riser, and effecting energization of said transmitter and severance of said pocket cord and said detent cord whereby said switch is closed to activate said inflator and enable the inflating float to open said flaps and deploy the expanded float with said antenna erected to transmitting position.

5. Signalling apparatus adapted to be carried on the person of an aircraft occupant wearing a parachute which includes a riser, comprising:

a vest adapted to be worn by the occupant;

a first electrical energy source;

a radio frequency transmitter connected to said first source and energizable thereby, both said first source and said transmitter being carried in said vest;

a flapped pocket on said vest, said pocket having a plurality of normally outwardly opening flaps;

an inflatable float including a flexible erectile antenna mounted therein and having an end portion extending a predetermined distance above an extreme upper surface of said float, both said float and said antenna being normally held in collapsed condition in said pocket with flaps closed;

an electrical lead connecting said transmitter to said antenna;

a continuous pocket cord passing through holes near edges of the flaps of said pocket to close the same;

a reefing cutter located near said pocket, one bight of said pocket cord passing through said cutter for severance thereby when the parachute is deployed;

a second electrical energy source;

an inflator for said float, said inflator being electrically activatable and mounted to an extreme lower surface of said float to render the same bottom heavy, and including a normally open conductor path to said second energy source;

a switch for closing said conductor path to activate said inflator when said switch is closed, said switch being spring biased normally closed;

a detent cord connected at one end to said switch for holding the switch open, said detent cord also passing through said cutter and having its distal end anchored; and means connected to said riser for actuating said transmitter and energizing said cutter on tensioning of said riser, and effecting energization of said transmitter and severance of said pocket cord and said detent cord whereby said switch is closed to activate said inflator and enable the expanded float with said antenna erected to transmitting position.

References Cited in the file of this patent

UNITED STATES PATENTS

| | | |
|---|---|---|
| 2,473,050 | Camp | June 14, 1949 |
| 2,587,564 | Williams | Feb. 26, 1952 |
| 2,629,083 | Mason et al. | Feb. 17, 1953 |
| 2,722,342 | Fox | Nov. 1, 1955 |
| 2,780,689 | La Cavera | Feb. 5, 1957 |
| 2,825,803 | Newbrough | Mar. 4, 1958 |
| 2,870,281 | Mitchell | Jan. 20, 1959 |
| 2,907,875 | Seyfang | Oct. 6, 1959 |
| 2,932,732 | Gray | Apr. 12, 1960 |
| 2,993,118 | Block et al. | July 18, 1961 |
| 3,059,814 | Poncel et al. | Oct. 23, 1962 |